Oct. 17, 1967

M. R. NICHOLS 3,347,466

NACELLE AFTERBODY FOR JET ENGINES

Original Filed Feb. 28, 1963

*INVENTOR*
MARK R. NICHOLS

BY

*ATTORNEYS*

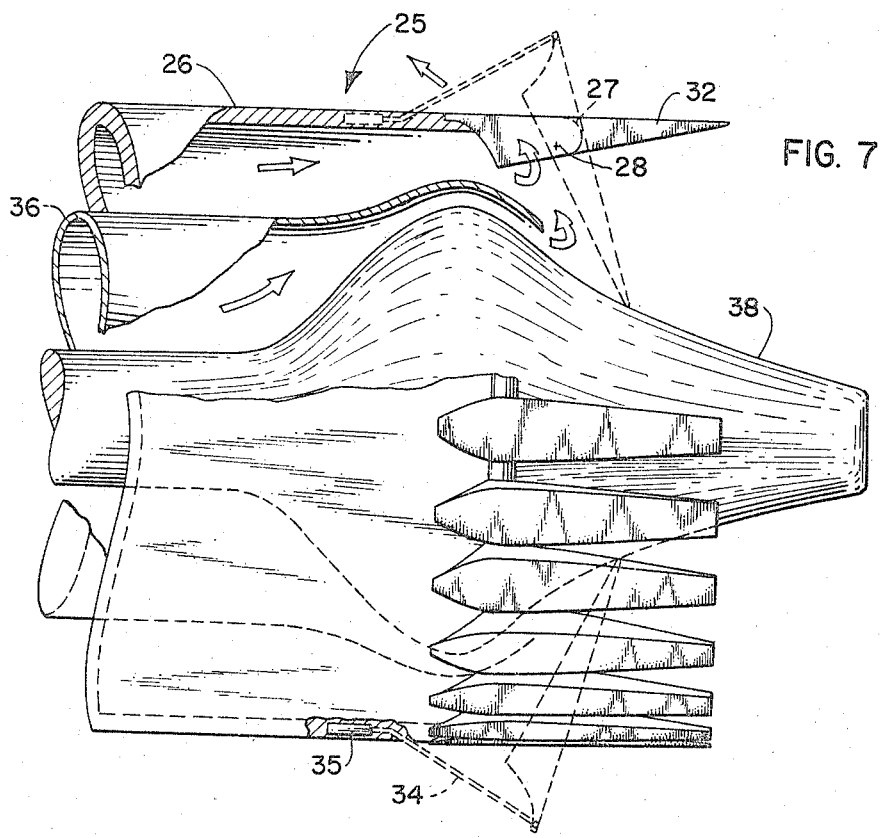
FIG. 7
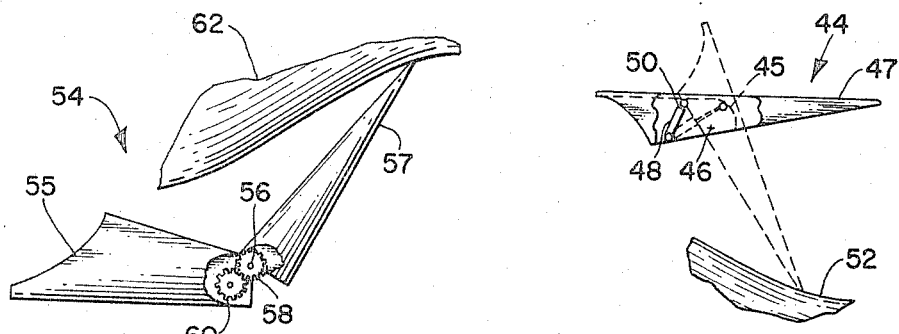
FIG. 9
FIG. 8

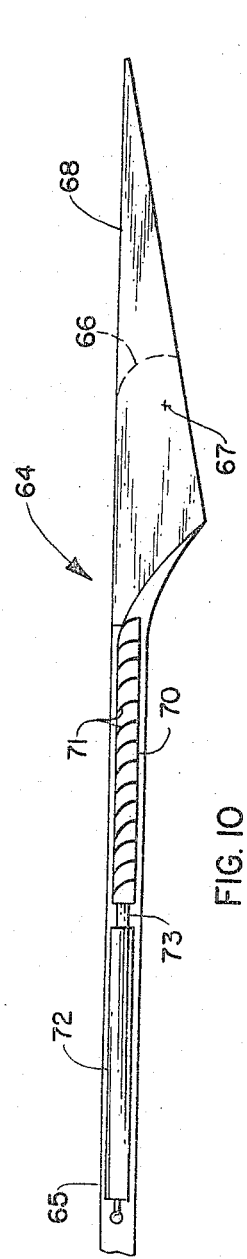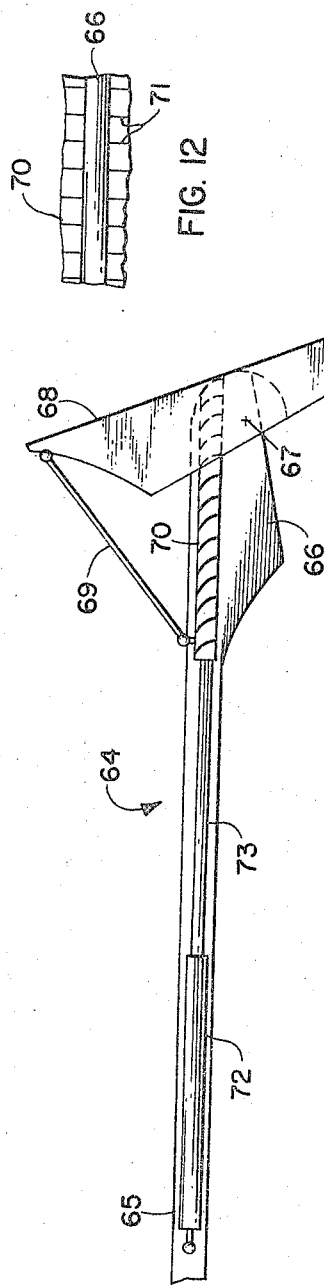

Oct. 17, 1967        M. R. NICHOLS        3,347,466
NACELLE AFTERBODY FOR JET ENGINES
Original Filed Feb. 28, 1963                5 Sheets-Sheet 4

INVENTOR
MARK R. NICHOLS

BY
ATTORNEYS

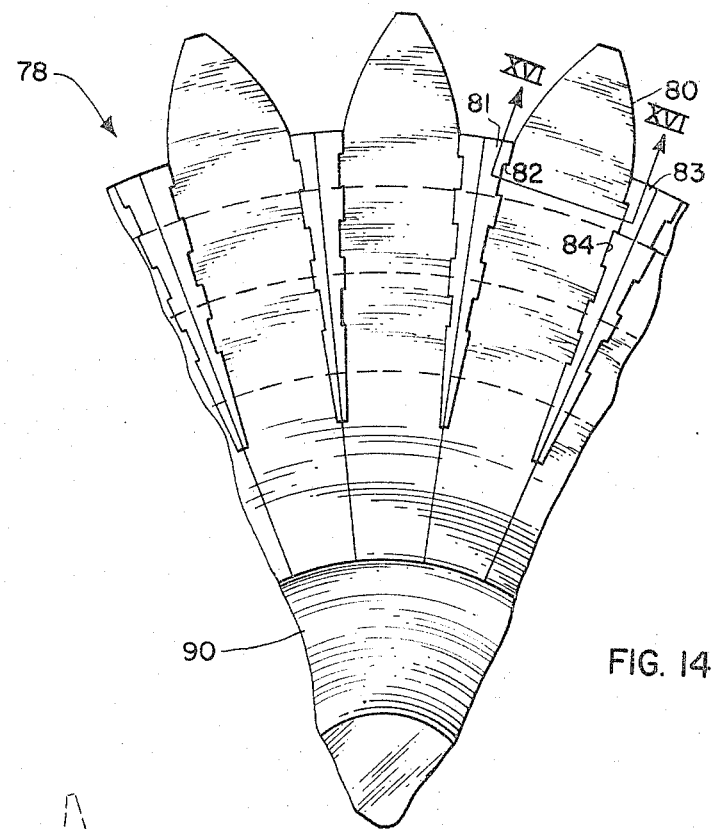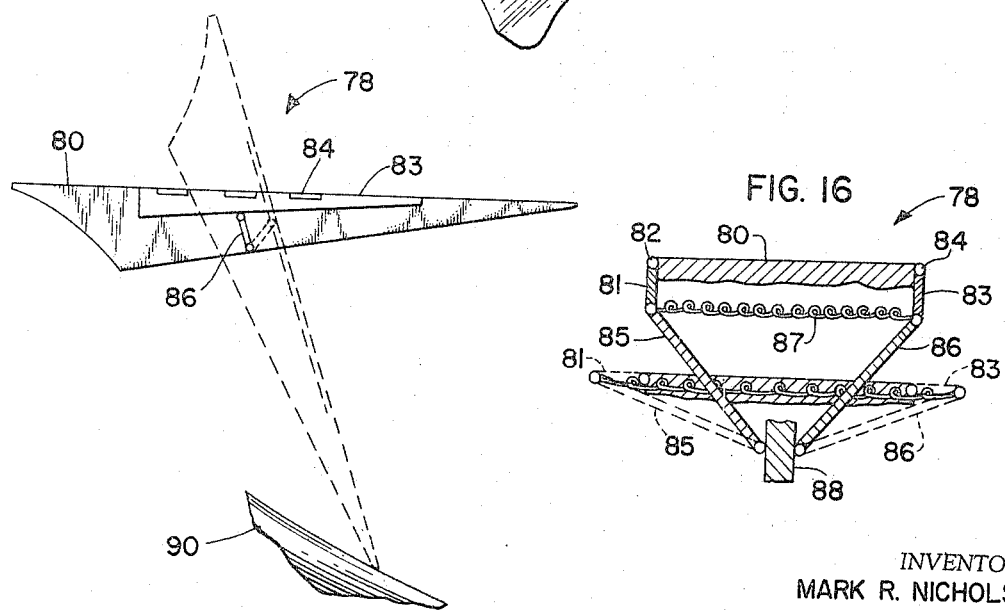

United States Patent Office 3,347,466
Patented Oct. 17, 1967

3,347,466
NACELLE AFTERBODY FOR JET ENGINES
Mark R. Nichols, Newport News, Va., assignor to the United States of America as represented by the Administrator of the National Aeronautics and Space Administration
Continuation of application Ser. No. 262,297, Feb. 28, 1963. This application Nov. 15, 1966, Ser. No. 594,587
39 Claims. (Cl. 239—265.19)

The invention described herein may be manufactured and used by or for the Government of the United States of America for governmental purposes without the payment of any royalties thereon or therefor.

This application is a continuation of application Ser. No. 262,297 dated Feb. 28, 1963, and entitled, Nacelle Afterbody for Jet Engines, now abandoned.

The present invention relates to afterburner-equipped jet engine nacelles and more particularly to afterburner-equipped jet engine nacelles wherein the after portion thereof is slotted.

In presently known nacelles for afterburning jet engines there has been experienced very important base and boattail drag in afterburner off-cruising flights resulting from the contraction of the variable area exit in this operating condition to maintain a proper mass flow through the engine. This contraction of the exist area produces a large base area annulus region, between the initial point of jet boundary and the external stream, which is usually acted on by suction (drag producing) pressure forces. In addition, the volume requirements of the exist operating mechanism, the nacelle structural requirements, and the desire to keep the nacelle diameter as small as possible relative to the maximum diameter of the engine combine to dictate the use of a short and steep boattail fairing ahead of the base and that the jet aspirates the flow in the separated region of the boattail and over the base to a much lower pressure than would exist without jet operation. Numerous experiments have shown that jet effects on afterbody drag are favorable on bodies of lower boattail angle (under 45°) and unfavorable on bodies of higher boattail angles, and that the latter effects cannot be reduced significantly by simply increasing the amount of afterburner shell cooling flow emitted in the nacelle base region. The low pressures over the aft end of the boattail and over the base (even in the case where the flow over the boattail is not separated) are the direct cause of the excessive drag previously mentioned. This situation exists regardless of whether the nacelle is an isolated component of the airplane or is an integral part of the fuselage or wing. In the afterburner-on operation, a simple convergent nozzle has been found to provide near maximum jet engine thrust up to a flight Mach number of about 1.5. At higher speeds new types of nozzles (such as ejector nozzles, converging-diverging nozzles, and converging-diverging plug nozzles) have been found to be necessary in order to avoid important thrust losses through inefficient expansion of the jet flow. All such schemes, however, suffer from mechanical complexity, weight penalties, and cooling problems associated with the need for extensive variation of the aft end geometries of the engine and nacelle as the flight conditions are changed.

These disadvantages are overcome by a unique nacelle structure constructed in accordance with principles of the equivalent body theory. According to the equivalent body theory as outlined in the publication NACA RM—L52H08, the interference drag at transonic speed is primarily dependent on the cross-sectional areas normal to the airstream, the drag decreasing in proportion to how closely the cross-sectional areas approach a theoretical optimum body shape. The invention involves the addition of several three-dimensional bodies or "horns" extending aft from the steep portion of the boattail portion of the engine nacelle and from any blanked-off portion of the nacelle base to form a slotted surface aft of the annular base surrounding the nozzle of the primary jet. According to the equivalent-body theory as outlined above, this addition to the nacelle body will effectively increase its fineness ratio or the ratio of nacelle body length to the maximum diameter thereof and generally reduce the effective slope of the boattail by changing the cross-sectional area of the nacelle body normal to the airstream so that it approaches an optimum shape having a reduced boattail angle. The reduction in effective slope of the original boattail will reduce its pressure drag and tend to eliminate flow separation. In addition, the increase in pressure over the boattail together with the elimination of flow separation will cause a major increase in the pressure over the base, thus reducing the base drag and also causing the jet effects to become useful. Accordingly, the internal and external flows are not isolated aft of the start of the slots and the external flow can penetrate the slotted surface to raise pressures over the aft end of the boattail and the base. Furthermore, the jet flow is not confined so that thrust losses due to overexpansion of the jet (such as occur in the case of a solid-walled converging-diverging nozzle operating below its design pressure ratio) can be avoided. In afterburner-on operation at high ratios of the jet pressure to the stream pressure (such as occur in supersonic flight), the slotted nacelle afterbody provides increased thrust by cushioning the expansion of the jet and simultaneously providing aft-sloping physical surfaces for the jet to react against (in accelerating) itself. In addition, compression shocks in the external stream, caused by interaction of this stream with the expanding jet, impinge on the aft-sloping surface of the boattail and horns and reduce the nacelle drag through the mechanism of increasing the surface pressures.

Experiments have also shown that the horns or afterbodies can be hinged to the nacelle and diverted by actuation means to provide a thrust-reversing device. Thus, the horns are capable of performing a dual function. It has also become apparent that this technique has an application as a thrust reverser for a supersonic, nonmixed flow (dual-stream) turbo fan engine being proposed for use on supersonic transports. Since this engine must have the capability of variable throat area in the outer annular duct, the outer surface of the nacelle and/or the duct divider and the central plug must be movable. The application of this invention does not prevent either action. Various applications of the invention also provide means whereby the center stream only, of a dual (coaxial) exhaust jet stream or fan engine, is reversed by the horns and the outer stream reversed by separate means. This arrangement is of special interest since the device can operate while the vehicle is airborne as a flightpath control, decelerator, thrust modulator, or supplement to the airplane aerodynamic control. This is significant since the pressures in the gas-generator (primary) and by-pass duct (secondary) nozzles of most fan and other dual-stream engines begin to differ as the flight speed is increased beyond Mach. 1. Thus, there is an interaction between the two streams which may affect the operation of one or both streams and at the least introduce important engine control problems.

In addition to the above features, the horns or afterbodies are provided with flaps which are extended in the deflected position of the horns. These flaps operate to close the slotted areas between the horns when they are in the thrust-reversing position; however, otherwise assume a position so as to avoid adversely affecting the aerodynamic properties of the nacelle and the horns.

An object of the present invention is the provision of a jet engine nacelle which has reduced base and boattail drag as compared with present known apparatus.

Another object is to provide increased engine thrust in afterburning jet engines operating at supersonic speeds.

A further object of the invention is the prevention of flow separation over the boattail portion of a jet engine nacelle.

Still another object of the invention is to provide near maximum engine thrust and low nacelle drag over the complete range of flight conditions without resorting to complex flow-expanding engine exhaust nozzle and variable geometry of the nacelle afterbody.

Yet another object of this invention is to provide a jet engine nacelle having means affixed thereto which effectively increases the cross sectional area of the nacelle and thereby modifies the flow of gases exhausting from the aft end thereof.

Another object of this invention is to provide a jet engine nacelle having means which reduces base and boattail drag and increases engine thrust, as well as operating as a thrust-reversing mechanism.

An additional object of the invention is to provide a thrust-reversing mechanism which has application to a supersonic, nonmixed flow, dual-stream, turbo fan engine, mixed flow fan engine or conventional jet engine.

Yet another object of this invention is to provide a jet engine nacelle which has thrust-reversing mechanism which also can be utilized as a supplement to airplane aerodynamic controls.

Another object of this invention is to provide a jet engine nacelle having mechanism for thrust-reversing wherein the mechanism is of a simple mechanical design and of a minimum weight.

Still another object of this invention is to provide a thrust-reversing device that does not have to rely on heavy sliding plates or bellows-type seals between adjacent elements of the variable-geometry nozzle surfaces.

A further object of the invention is to provide a thrust-reversing device which can be utilized to reverse the center stream only of a dual concentric-stream engine.

Yet another object of this invention is to provide a thrust reverser usable with a dual concentric-stream engine where the outer fairing and/or the stream separator and central plug can be translated relative to each other.

Other objects and many of the attendant advantages of this invention will be readily appreciated as the same becomes better understood by reference to the following detailed description when considered in connection with the accompanying drawings wherein:

FIG. 7 is a segmental side elevational view, partially cut away, showing a thrust-reverser system for a dual exhaust stream jet or fan engine;

FIG. 8 is a segmental side elevational view, partially cut away, to illustrate an alternate horn-deflecting mechanism;

FIG. 9 is a segmental side elevational view, partially cut away, to show another arrangement for actuating the horns;

FIG. 10 is a segmental side elevational view of still another horn-actuating technique including additional stream-directing structure, the horn and stream-directing structure being shown in the undeflected position;

FIG. 11 is a segmental side elevational view of the structure shown in FIG. 10, with the horn and stream-directing structure shown in the deflected position;

FIG. 12 is a sgemental plan view of the stream-directing structure of FIGS. 10 and 11;

FIG. 14 is a segmental plan view of a modified form of the invention showing the horns in the deflected position with slot closing flap structure in the extended position;

FIG. 15 is a segmental side elevational view of the device shown in FIG. 14;

FIG. 16 is a cross sectional view taken along the section lines XVI—XVI of FIG. 14, showing the positions of the flaps in the collapsed and the extended positions;

Figure 1:
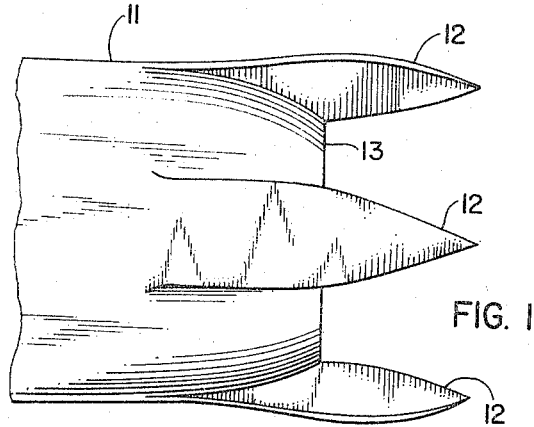
FIG. 1 is a side view of one embodiment of the invention.
Figure 2:
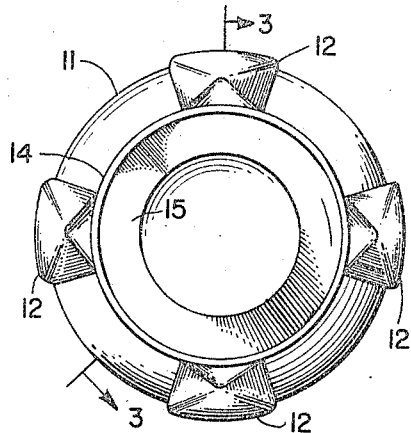
FIG. 2 is an end view of the embodiment shown in FIG. 1.
Figure 3:
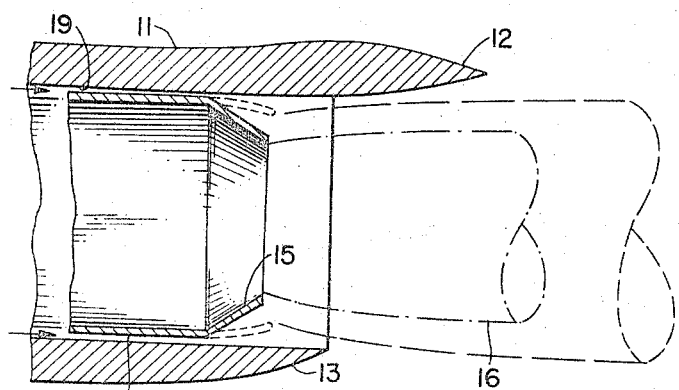
FIG. 3 is a section taken along the lines 3—3 of FIG. 2.
Figure 4:
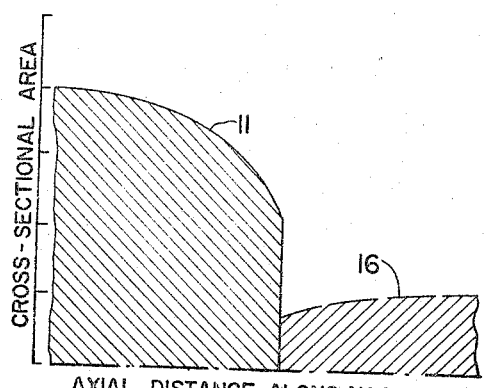
FIG. 4 is a plot of the longitudinal variation of the cross-sectional area of the aft end of a conventional nacelle and the initial part of its afterburner-off jet.
Figure 5:
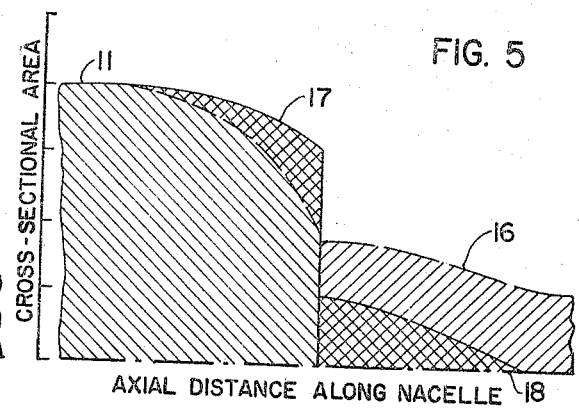
FIG. 5 is a plot of the longitudinal variation of the cross-sectional area of the nacelle of the present invention and its afterburner-off jet.

Referring now to the drawings, wherein like reference characters designate like or corresponding parts throughout the several views, FIGS. 1–3 illustrate an end portion of a jet engine nacelle 11 encircling a jet engine tailpipe 14. A passageway 19 is provided between the tailpipe 14 and nacelle 11 for permitting cooling airflow about the tailpipe, as represented by the arrowheads on FIG. 3. A variable exit device 15, such for example as a conventional clamshell or iris configuration, is attached to the tailpipe terminus. In the illustrated constricted position of exit device 15, the jet afterburner, no shown, is off and the resulting jetstream is represented by the inner dotted line of FIG. 3. In its alternate extended position, shown in dotted lines, the jet afterburner is on and the resulting jetstream is represented by the outer dotted line of FIG. 3. Several three-dimensional bodies 12 or "horns" are extended aft from the steep portion of the boattail 13 to alter the longitudinal variation of cross-sectional area of the nacelle 11 and its nonafterburning jet 16 from that shown in FIG. 4 to that shown in FIG. 5. The vertical line in the center of FIGS. 4 and 5 is at the location of the nacelle base and the discontinuity or downward jog in the area curves at this station is caused by the base area which is the blunt region at the rear of the nacelle. In this case, the base area is considered to be the annular area viewed from the rear between the innermost edge of exit device 15 and the rearmost external point on the boattail. In FIG. 5, the double cross-hatched regions 17 and 18 represent the cross-sectional areas contributed upstream and downstream of the nacelle base, respectively, by the addition of the "horns" 12. The pressure drag of a body near the speed of sound is directly related to the local slopes of such an area diagram, i.e., the steeper the slope the greater the drag. Thus, the addition of the forward parts of the horns (area 17 of FIG. 5) reduces the pressure drag of the boattail ahead of the base by reducing the effective slope of its area diagram, as well as helping to eliminate any flow separation in this region. The parts of the horns aft of the nacelle base (area 18 of FIG. 5) are added to prevent the overall base area from increasing because of the addition of the forward parts of the horns and to receive thrust pressure forces from the expanding jet.

As a specific example of the size, shape, orientation, etc., of the horns, it has been found that the total cross-sectional area 17 added upstream of the base may be taken as the amount required to obtain the same total area distribution ahead of the base as a minimum-drag body-of-revolution afterbody having the same length and an approximately eight-degree local boattail angle at its base. The portion of horns 12 aft of the base should have fineness ratios of at least four to minimize their pressure drag and should extend aft a distance equal to one-half to one and one-half the primary nozzle diameters in order to derive thrust forces from the jet in afterburner-on operation. As is clearly shown in FIGS. 1–3, the portion of surfaces of the horns 12, there being four distinct surfaces illustrated, forward of the nacelle aft end has a progressively increasing dimension from its forward extremity to a maximum dimension substantially at the nacelle end. The portion of each surface of the horns aft of the region of maximum dimension has a progressively decreasing dimension to a point which may be blunt. The outermost surfaces of the horns have as great or greater dimension than any of the other surfaces. The cross-sectional shape of the horns in a plane perpendicular to the longitudinal extent of the nacelle should be such that all the physical lines of the afterbody are faired smoothly and generous radii are provided where either the external or internal stream must flow around a corner in off-design operation.

Figure 6:
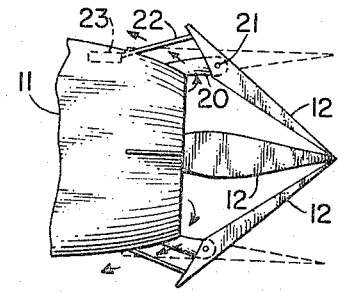
FIG. 6 is a side elevational view of the invention showing an arrangement for deflecting the horns for thrust-reversing purposes.

Horns 12, if properly shaped and hinged, also can be used as a means for obtaining reverse thrust for deceleration and braking purposes and in providing radial forces for use in control of the airplane. In the first case, the horns are hinged aft of the base and are actuated so that their downstream tips fold together blocking the jet flow. The blocked flow then must escape in a sideways or rearward direction from slots opened up beneath the horns and from the open spaces between the horns, thus providing the retarding force. In the second case, the arrangement is similar to the first, except that only part of the hinged horns are dipped into the jet to bring about asymmetry of the jet and external flows. These flow asymmetries provide the radial control forces desired. This arrangement is illustrated in FIG. 6 (the horns 12 are shown hinged to afterbody supports 20). The horn 12 is slotted such that when it is in the undeflected position it covers the afterbody support 20. The hinge 21 is of a conventional design, the horn being rotatable with the shaft journaled in the afterbody support 20. Fixed to the portion of the horns forward of the aft end of the nacelle are actuator rods 22 for the respective horns. The actuator rods 22 are also connected to actuators 23 carried by the nacelle 11. The actuators may be pneumatic, hydraulic or some other mechanism capable of importing a translational movement to the actuator rods 22. The actuators 23 may be energized simultaneously or selectively to provide for reversing or aerodynamic control assist. A valve or other mechanism which would accomplish this type of control is believed conventional and will therefore not be explained in detail.

Modifications

The principle of the invention discussed above has also been found to have application to a dual exhaust stream, jet or fan engine of the nature illustrated in FIG. 7 and designated generally by the reference numeral 25. The dual exhaust fan engine 25 has a nacelle 26 which is generally of the same configuration as the nacelle 11. The nacelle 26 is provided with a number of support extensions or projection 27 equally spaced about the circumference of the nacelle. They extend beyond the aft end of the nacelle and operate as a support for the afterbodies or horns 32 pivotally mounted thereon by pivotal connections 28. The pivotal connections 28 are of a conventional design, and consist of shafts journaled in the support extensions 27.

Figure 13:
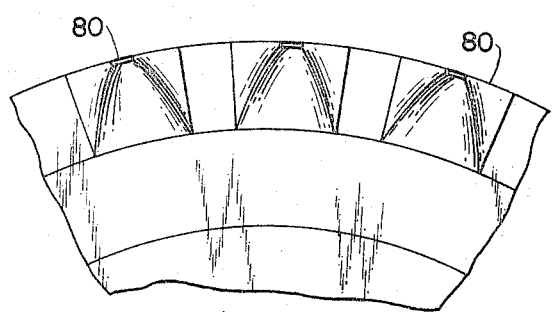
FIG. 13 is a segmental end view of the invention showing the shape of the horns.

The horns or afterbodies 32 are designed so as to give the same advantages as the horns 12 discussed above. Surfaces of the horns 32 forward of the nacelle aft end have a progressively increasing dimension from their forward extremity to maximum dimensions substantially at the nacelle end. Surfaces of the horns aft of the region of maximum dimension have a progressively decreasing dimension to their terminus. The outermost surfaces of the horns have as great or a greater surface area dimension than any of the other surfaces of the horn. The innermost surface of the horns 32 are channeled or grooved so as to be able to straddle the nacelle extension 28 and thereby fit into the aerodynamic design of the nacelle when in the undeflected position. The forwardmost area of the horns 32 are undercut to correspond in configuration to the boattail angle of the nacelle 26. FIG. 13 illustrates the shape of the horns as viewed from the engine exhaust end.

Fixed to the horns 32 by a universal-type connection of conventional design are actuator rods 34. These rods are in turn connected at the other end by a universal-type conection to actuators 35. The actuators 35 may be pneumatic, hydraulic, etc., as explained above. Also, they may be actuated simultaneously for thrust-reversing or differentially to provide control assist. It should also be understood that it is within the broadest aspect of the invention to join the actuators mechanically or electrically in a manner such that a central actuator or three or four equally disbursed actuators may be utilized to deflect the horns.

The engine 25 otherwise includes a stream-divider 36 and plug 38 both of which are of a conventional design in dual-concentric jetstream engines. The horns 32 are shown in the deflected position (in dotted lines) in FIG. 7. From this illustration, it is clear that the ends of the horns will engage the plug 28 and both the inner and outer streams as indicated by the flow arrows will be diverted and flow in a direction so as to give a thrust-reversing component.

Different mechanism for deflecting the horn or afterbody is illustrated in the embodiment shown in FIG. 8, and designated generaly by the reference numeral 44. In this embodiment, the horn 47 is movable about the pivotal connection 46 carried by the nacelle projection 45. The actuator 48 is housed within the horn 47. One end of the actuator 48 is fixed to the nacelle projection 45 and the other end to the horn 47. Upon extension of the actuator rod, the horn 47 is deflected to the dotted line position as shown in FIG. 8. In the deflected position the horn abuts the plug 52, a segment of which is shown in FIG. 8. In this embodiment, each horn would be equipped with an individual actuator 48. As in the previous arrangements, the actuator could be any type which would impart translational movement to a member associated therewith.

Another actuation technique is illustrated in FIG. 9 and designated generally by the reference numeral 54. In this arrangement the split horn is supported by the nacelle projection 55. The split horn 57 is of generally the same configuration as those previously described; however, it is segmented so that approximately the forwardmost third of the horn is fixed to the nacelle extension 55 and the remaining part of the horn has a pivotal connection 56 with the nacelle extension 55. The nacelle extension 55 has journaled thereon a drive gear 60 which is in turn connected to an appropriate power source (not shown) such as in electrical motor of conventional design. The drive gear 60 meshes with a gear segment 58 either formed on or carried by the horn 57. Rotation of the gear 60 moves the horn 57 from an undeflected position to a deflected position and vice versa. In the deflected position, the horn 57 engages the plug 62, a segment of which is shown in FIG. 9.

An actuation device designated generally by the reference numeral 64, is shown in FIGS. 10–12 which provides the duel function of deflecting the horn and initiating the operation of a jetstream director. As in the previous embodiments, the horn 68 has a pivotal connection 67 with the nacelle projection 66. Universally connected to the forward end of the horn 68 is an actuator arm 69 which also has a universal connection with a stream director 70. The director 70 has a series of vanes 71 which are positioned to guide the jetstream in a thrust-reversing direction as shown in FIG. 11. The director 70 may be a bifurcated member, as shown in FIG. 12, inner-connected by tie rods (not shown) which operate in a slot (not shown) formed in the nacelle projection 66. A motivator 72 is carried by the nacelle 65 and has a link 73 which is connected to the stream director 70. When the horn 68 is in the undeflected position (FIG. 10) the stream director 70 is withdrawn into the nacelle 65. To deflect the horn 68, the motivator 72 is energized and the link 73 is extended together with the director 70. Since the horn actuator rod 69 is affixed to the director 70 and the horn 68, the horn will be pivoted about its connection 67 to the deflected position as the director is extended. Obviously, when the director 70 is withdrawn, the horn 68 is pivoted to the undeflected position.

It is to be understood that it is within the broadest aspect of the invention to provide separate actuation means for the horn 68 and utilize the motivator 72 only for extending and retracting the stream director 70. Such an arrangement may be desirable under certain circumstances. Although the director 70 is shown as a bifurcated member in FIG. 12, a one-piece unit could be placed in the slot between adjoining horns and result in an equally operable structure. As in the previous embodiment, the horn 68 would engage the plug in the deflected position, a segment of the plug being shown in FIG. 12, and designated 74 in this embodiment.

Due to this arrangement of the horns at spaced intervals above the circumference of the nacelle, slots or open areas appear between each one of the horns. This is also true when the horns are in the deflected position. Since the horns are designed to operate as thrust-reversers in the deflected position, it is not desirable to have open areas between the horns when they are deflected. The horn modification shown in FIGS. 14–16, and designated generally by the reference numeral 78, is designed to fill the openings between the horns. In this embodiment, each of the horns 80 is provided with left flap 81 and right flap 83. The left flap 81 is fixed to the horn 80 by hinge connection 82. The right flap 83 also has a hinge connection 84 with the horn 80. The flaps 81 and 83 are of a generally triangular configuration such that when they are open, they fill the gap between the horns 80 as clearly illustrated in the plan view FIG. 14. In certain applications, the flaps may be rigidly fixed in the open position, the circumstances being when they do not adversely affect the aerodynamic properties of the nacelle.

FIGS. 15 and 16 show an arrangement whereby the flaps are automatically opened and closed upon the movement of the horn 80 from the undeflected position to the deflected position and vice versa. In the undeflected position of the horn, the flaps 81 and 83 are held against the sides of the horn by a tension spring 87. The sides of the horn 80 may be recessed such that the flaps fit within the boundaries of the horn so as not to interfere with the aerodynamic properties of the horn. A left and right toggle 85 and 86, respectively, is universally connected to the bottom edges of the respective flaps 81 and 83 and to opposite sides of the nacelle extension or projection 88. The toggles 85 and 86 are so arranged that when the horn 80 is moved into the deflected position, the toggles force flaps 81 and 83 to an open position as shown in dotted lines, FIG. 16. Obviously, when the horn 80 returns to the undeflected position, the tension spring 87 will draw the flaps 81 and 83 back into the sides of the horn. As shown by FIG. 14, each horn 80 is provided with the flap structure explained above, and as the horns are deflected, the flaps open in a manner such that flaps of adjacent horns assume an abutting relationship. In certain instances, it may be desirable to have the flaps overlap when in the open position to increase the strength properties of the flap and eliminate possible jetstream leakage between the flaps. When the horns are in the deflected position, their ends engage the plug 90, a segment of which is shown in FIGS. 14 and 15.

Figure 17:
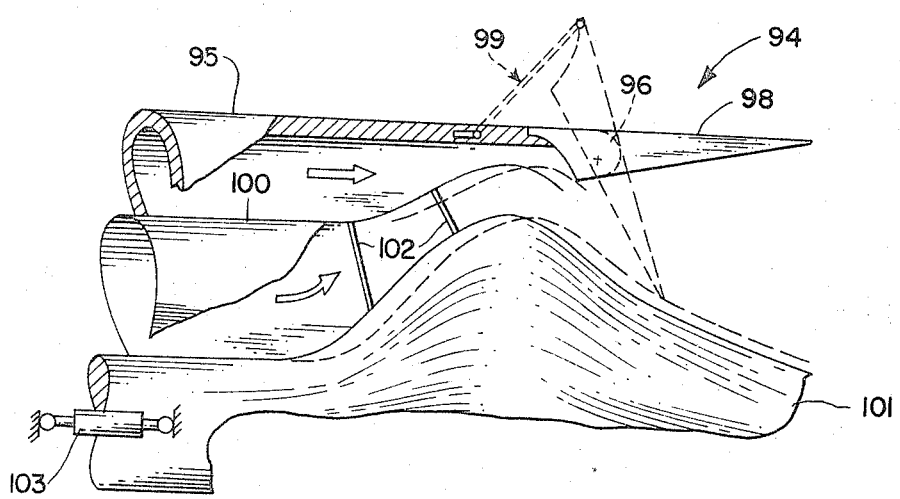
FIG. 17 is a sgemental side elevational view, partially cut away, to show an arrangement whereby the horn in the deflected position diverts only the center stream.

Illustrated in FIG. 17 is a central stream diverter assembly designated generally by the reference numeral 94. This assembly includes a nacelle 95 which has projections 96 on which are pivotally mounted horns 98. The horns 98 are moved from an undeflected position to a deflected position and back by the actuator rods 99 which are universally connected thereto and to an actuator (not shown), the actuator arrangement being similar to that shown in FIG. 7. The assembly also has a stream divider 100 and plug 101 both of which are of conventional design. The stream divider 100 and plug 101 are rigidly connected together by struts 102 which are placed at intervals about the circumference and along the longitudinal axis of the plug. A prime mover 103, shown diagrammatically, is fixed to the plug and to a reaction member such that when it is energized the plug 101 and stream divider 100 are moved forward to the dotted line position. When the plug and stream divider are in the dotted line position, the stream divider 100 abuts the nacelle as shown in FIG. 17 and blocks the flow of the outer jetstream. The outer jetstream is thus forced to exhaust through additional ports (not shown) formed in the nacelle 95, these ports being positioned well forward of the horns 98. The ports may be provided with jetstream director structure such as illustrated in FIGS. 10–12 so that the jetstream is utilized as a reversing component.

Figure 18:
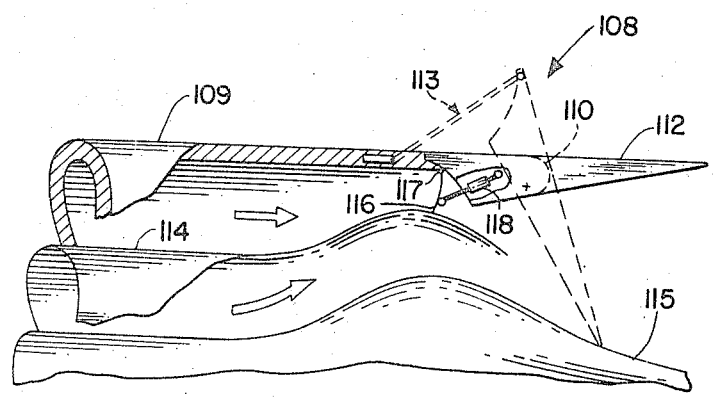
FIG. 18 is a segmental side elevational view, partially cut away, to show another technique whereby the horn in the deflected position diverts only the innermost jet stream.

Another arrangement for central stream diversion is illustrated in FIG. 18 and designated generally by the reference numeral 108. The central stream diverter assembly 108 includes a nacelle 109 with nacelle projections 110 on which are pivotally mounted horns 112 as in previous embodiments. The horns 112 are deflected by actuating rods 113 and actuators (not shown) similar to those illustrated in FIG. 7. A stream divider 114 and plug 115 are provided as in the FIG. 17 embodiment; however, are not connected together nor are they adapted to be translated. Rather, the flow of the outer jetstream is blocked by deflector plates 116 which are hinged at 117 on the nacelle 109. These plates are moved into a blocking position by a power cylinder 118 which is fixed to the nacelle extension 110 and to the deflector plates. The power cylinder 118 may be a pneumatic or hydraulic cylinder or other conventional mechanism utilized to impart translational movement to a member. As in the FIG. 17 arrangement, ports must be provided in the nacelle 109 forward of the deflector plates 116 to provide for exhausting of the outer jetstream. The dotted line position of the horn 112 clearly shows that only the innermost or central jetstream will be diverted by the horns 112. The importance of being able to divert the outer or secondary jetstream ahead of the inner or primary jetstream is that the pressures in the gas-generator (primary), and bypass-duct secondary nozzles of most fan and other dual-stream engines, begin to differ significantly as the flight speed is increased beyond the speed of approximately Mach 1. Thus, there is an interaction between the two streams which affect the operation of one or both streams that introduces engine control problems.

From the above description, it can be seen that the invention is applicable to a nonmixed flow fan engine or simple jet engine. The addition of the horns in the undeflected positions from a slotted extension to the nacelle fairing which provides an efficient expansion (thrust recovery) of the internal flow and significant nacelle drag reduction by effectively increasing the cross-sectional area of the nacelle. In addition, by hinging the horns on the nacelle and providing simple actuating mechanism, the horns can be utilized for reversing the thrust of the engine. By adding flap structure to the horns, the slots between the horns can be blocked providing a highly efficient thrust-reversing arrangement. The flaps may be opened and closed by a simple mechanical structure eliminating the necessity for complicated actuation means. Separate actuators can be provided for each horn or the horns can be linked and operated by one or several actuators which can be located at various positions. With this arrangement it is also possible to pivot the horns so as to reduce the required actuator forces because the rearward pressure forces act on both sides of the pivot. It is also possible to use this invention wherein the outer fairing and/or the stream separator and the central plug can be translated relative to each other. Since the invention has this capability, it is possible to divert only the central stream with the advantages pointed out above. The device is also capable of supplementing aerodynamic control by deflecting the horns differentially. The structure of the mechanism is simple, light and reliable. Geometry variations are accomplished without the requirement of sliding plates or bellows to seal between surface segments which also require complicated linkages. It is suggested that the present invention may weigh one-half (or less) as much as a conventional nozzle thrust reverser of comparable effectiveness and efficiency.

The above example is by way of illustration only and obviously many modifications, combinations and variations of the present invention are possible in the light of the above teachings. It is therefore to be understood that within the scope of the appended claims the invention may be practiced otherwise than as specifically described.

I claim:

1. In an airplane comprising. a nacelle; a propulsion reaction engine mounted within said nacelle; said nacelle having a bottailed aft end; an exit device through which gases exhausting from said engine are directed toward said aft end; and a plurality of body means spaced about and faired into said nacelle on the exterior of the boattailed aft end extending forwardly and rearwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of the nacelle end effectively increasing the cross sectional area of said nacelle and decreasing its slope angle and rearward of the nacelle aft end and preventing an increase in overall base area due to the forward area and also receiving thrust forces from engine exhaust gases whereby pressure drag is reduced and pressure on the nacelle end is increased while maintaining a fixed structural geometry.

2. In an airplane, a nacelle, a propulsion reaction engine mounted within said nacelle; said nacelle having a steeply boattailed aft end, an exit device through which gases exhausting from said engine are directed toward said nacelle aft end; and a plurality of body means spaced about and faired into said nacelle on the exterior of the boattailed aft end extending forwardly and readwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; said body means being so formed that the combined cross-sectional area of said nacelle and said bodies forward of said aft end approaches that of a minimum-drag body-of-revolution of the same length.

3. In an airplane as in claim 2 wherein said body means has an outermost surface area which is at least as great as any other surface area of said means.

4. In an airplane as in claim 2 wherein said body means is streamlined both forward and aft of said nacelle aft end to reduce drag.

5. In an airplane, a nacelle; a propulsion reaction engine mounted within said nacelle; said nacelle having a steeply boattailed aft end; an exit device through which gases exhausting from said engine are directed toward said nacelle aft end; said exit device being mounted within said nacelle and forward of said aft end; and a plurality of three-dimensional body means having surfaces certain of which are exteriorly affixed to said nacelle adjacent said boattailed aft end; said body means extending forwardly of said nacelle aft end and rearwardly beyond said aft end and having a substantial circumferential surface area; the portion of surfaces of said body means forward of said nacelle aft end being faired into said nacelle and having a progressively increasing dimension from the forward extremity thereof to a maximum dimension substantially at said nacelle aft end, the portion of each surface of said body means aft of the region of said maximum dimension having a progressively decreasing dimension to a point; said bodies extending rearwardly of the end of the nacelle being designed so that all surfaces thereof are exposed to flow thereover permitting simultaneous flow of a radial component of velocity of either external flow or propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry, said body means being so formed that the combined cross-sectional area of said nacelle and said body means forward of said aft end approaches that of a minimum-drag body-of-revolution of the same length.

6. The airplane as set forth in claim 5 in which said nacelle has a base portion defined by an annular area between said exit device and said aft end, the portions of said three-dimensional body means extending rearwardly of said base having fineness ratios of at least four.

7. The airplane as set forth in claim 5 in which said portions of said three-dimensional body means extending rearwardly of said base each have a length of from one-half to one-and-one-half the diameter of said exit device.

8. An airplane as in claim 5 wherein said three-dimensional body means have grooves formed on the innermost surfaces thereof forming a reaction surface for propulsion engine gases.

9. In an airplane comprising: a nacelle; a propulsion reaction engine mounted within said nacelle; said necelle having a boattailed aft end; and exit device through which gases exhausting from said engine are directed towards said aft end; a plurality of body means spaced about and faired into said nacelle on the exterior of the boattailed aft end extending forwardly and rearwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of said nacelle end effectively increasing the cross sectional area of said nacelle and decreasing it slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; and means for deflecting said body means to also provide thrust reversal.

10. An airplane as in claim 9 wherein said body means have substantial circumferential surface area; said bodies being affixed to said nacelle adjacent said boattailed aft end at equally spaced intervals thereabout.

11. In an airplane as in claim 10 wherein said body means are hinged to said nacelle; and actuator means for deflecting said body means into the exhaust of said engine to reverse the direction thereof.

12. In an airplane comprising: a nacelle; a propulsion reaction engine mounted within said nacelle; said nacelle having a boattailed aft end; an exit device through which gases exhausting from said engine are directed towards said aft end; a plurality of body means spaced about and faired into said nacelle on the exterior of the boattailed aft end extending forwardly and rearwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increasing while maintaining a fixed structural geometry; said body means being hinged to said nacelle, and actuator means for deflecting said body means into the exhaust of said engine to also reverse the direction thereof.

13. In an airplane as in claim 12 wherein said body means is a plurality of horns, said actuator means including a plurality of actuator rods connected to said horns, said actuator rods being connected to motivation means.

14. In an airplane as in claim 12 wherein said body means is a plurality of horns, said actuator means including a plurality of motivators connected to said nacelle and to said horns; said motivators being housed within said horns.

15. In an airplane as in claim 12 wherein said body means is a plurality of split horns, and gear means to deflect segments of said split horns.

16. In an airplane as in claim 12 wherein said body means is a plurality of horns, said actuator means including a plurality of actuator rods connected at one end to said horns; said rod being connected at the other end to jetstream director means; and motivator means connected to said jetstream director means for extending and retracting said jetstream director means and simultaneously deflecting said horns.

17. In an airplane as in claim 12 wherein said jetstream director means has a plurality of vanes for guiding the jetstream in a reverse direction.

18. In an airplane as in claim 12 wherein said body means is a plurality of horns, and flap means connected to said horns, said flap means closing any gap between said horns when in the deflected position.

19. In an airplane as in claim 18 wherein said flap means includes a flap hinged to either side of said horns, and means associated with said flap means whereby said flaps are automatically opened upon deflection of said horns and closed upon said horns returning to the undeflected position.

20. In an airplane as in claim 18 wherein said flap means includes a flap hinged to either side of said horns, a toggle connected to each flap and to said nacelle, and resilient means connected between the flaps on each horn; said toggles automatically opening said flaps upon deflection of said horns and said resilient means closing said flaps upon said horns returning to the undeflected position.

21. In an airplane comprising: a nacelle, a dual jetstream propulsion reaction engine mounted within said nacelle; a plug housed within said nacelle; a stream divider surrounding said plug and being spaced from said plug and said nacelle; said nacelle having a boattailed aft end; a plurality of body means spaced about and faired into said nacelle on the exterior of the boattailed aft end extending forwardly and rearwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; and means for deflecting said body means to provide thrust reversal.

22. In an airplane as in claim 21 wherein said body means is a plurality of horns, said actuator means including a plurality of actuator rods connected to said horns, and motivation means connected to said actuator rods.

23. In an airplane as in claim 21 wherein said body means is a plurality of horns, said actuator means including a plurality of motivators connected to said nacelle and to said horns; said motivators being housed within said horns.

24. In an airplane as in claim 21 wherein said body means is a plurality of split horns, and gear means to deflect segments of said split horns.

25. In an airplane as in claim 21 wherein said body means is a plurality of horns, said actuator means including a plurality of actuator rods connected at one end to said horns; said rod being connected at the other end to jetstream director means; and motivator means connected to said jetstream director means for extending and retracting said jetstream director means and simultaneously deflecting said horns.

26. In an airplane as in claim 21 wherein said jetstream director means has a plurality of vanes for guiding the jetstream in a reverse direction.

27. In an airplane as in claim 21 wherein said body means is a plurality of horns, and flap means connected to said horns, said flap means closing gaps between said horns when in the deflected position.

28. In an airplane as in claim 27 wherein said flap means includes a flap hinged to either side of said horns, and means associated with said flap means whereby said flaps are automatically opened upon deflection of said horns and closed upon said horns returning to the undeflected position.

29. In an airplane as in claim 27 wherein said flap means includes a flap hinged to either side of said horns, a toggle connected to each flap and to said nacelle, and resilient means connected between the flaps on each horn; said toggles automatically opening said flaps upon deflection of said horns and said resilient means closing said flaps upon said horns returning to the undeflected position.

30. In an airplane comprising: a nacelle, a dual jetstream propulsion reaction engine mounted within said nacelle; a plug housed within said nacelle; a stream divider surrounding said plug and being spaced from said plug and nacelle; said nacelle having a boattailed aft end; a plurality of body means spaced about and faired into said nacelle on the exterior of the boattailed aft end extending forwardly and rearwardly of the end of the nacelle forming a generally slotted configuration; said body means extending rearwardly of said nacelle being designed so that all surfaces thereof are exposed to flow permitting simultaneous flow thereover of a radial component of velocity of either external flow or the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; means for deflecting said body means to provide thrust reversal; and prime mover means for translating said stream divider and plug to a position whereby said stream divider engages said nacelle to terminate the jetstream flowing between said stream divider and nacelle at said nacelle aft end.

31. In an airplane comprising: a nacelle, a dual jetstream propulsion reaction engine mounted within said nacelle; a plug housed within said nacelle; a stream divider surrounding said plug and being spaced from said plug and nacelle; said nacelle having a boattailed aft end; a plurality of body means spaced about and faired into said nacelle on the exterior of the boattailed aft and extending forwardly and rearwardly of the end of the nacelle forming a generally slotted configuration; said body means extending rearwardly of said nacelle being designed so that all surfaces thereof are exposed to flow thereover permitting simultaneous flow of the radial component of velocity of either external flow or the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; means for deflecting said body means to provide thrust reversal; diverter plates hinged to the interior of said nacelle, power cylinder means connected to said diverter plates and to said nacelle, said diverter plates when moved by said power cylinder means engaging said stream divider and terminating the jetstream flowing between said stream divider and nacelle at said nacelle aft end.

32. In an airplane comprising: a nacelle, a dual jetstream propulsion reaction engine mounted within said nacelle; a plug housed within said nacelle; a stream divider surrounding said plug and being spaced from said plug and nacelle; said nacelle having a boattailed aft end; a plurality of body means spaced about and faired into said nacelle on the exterior of the boattailed end extending forwardly and rearwardly of the end of the nacelle forming a generally slotted configuration; said body means extending rearwardly of said nacelle being designed so that all surfaces thereof are exposed to flow thereover permitting simultaneous flow of a radial component of velocity of either external flow or the propulsion engine exhaust gases; said body means forward of the nacelle end effectively increasing the cross sectional area of the nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; means for deflecting said body means to provide thrust reversal; and means for terminating the jetstream flowing between said stream divider and nacelle at said nacelle aft end.

33. In an airplane comprising: a nacelle; a dual jetstream propulsion reaction engine mounted within said nacelle; said engine having a plug; a stream divider surrounding said plug and being spaced from said plug and said nacelle; said nacelle having a steeply boattailed aft end; a plurality of spaced three-dimensional body means having surfaces certain of which are exteriorly affixed to said nacelle adjacent said boattailed aft end, said body means extending forwardly of said nacelle aft end and being faired into said nacelle and rearwardly beyond said aft end and having a substantial circumferential surface area; the portion of surfaces of said body means forward of said nacelle aft end having a progressively increasing dimension from the forward extremity thereof to a maximum dimension substantially at said aft end; surfaces of said body means aft of the region of maximum dimension having a progressively decreasing dimension, said body means extending rearwardly of said nacelle being designed so that all surfaces thereof are exposed to flow thereover permitting simultaneous flow of a radial component of velocity of either external flow or the propulsion engine exhaust gases; said bodies forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry, said body means being hinged to said nacelle, and actuator means for deflecting said body means into engagement with said plug whereby the exhaust of said engine is reversed.

34. In an airplane as in claim 33 wherein a flap is hinged to either side of each of said three-dimensional body means, a toggle connected to each flap and to said nacelle, and resilient means connected between the flaps on each three-dimensional body means, said toggles automatically opening said flaps upon deflection of said three-dimensional body means and said resilient means closing said flaps upon said three-dimensional body means returning to the undeflected position.

35. In an airplane as in claim 33 wherein said engine includes prime mover means for translating said stream divider and plug to a position whereby said stream divider engages said nacelle to terminate the jetstream flowing between said stream divider and nacelle at said nacelle aft end.

36. In an airplane as in claim 33 wherein diverter plates are hinged to the interior of said nacelle, power cylinder means connected to said diverter plates and to said nacelle, said diverter plates when moved by said power cylinder means engaging said stream divider and terminating the jetstream flowing between said stream divider and nacelle at said nacelle aft end.

37. In an airplane as in claim 33 wherein said nacelle includes jetstream director means slidably mounted therein; said jetstream director being extendable to a position whereby the jetstream is guided in a reverse direction thereby when the three-dimensional body means are in a deflected position, and motivation means connected to said jetstream director means for extending and retracting.

38. In an airplane, a nacelle; a propulsion reaction engine mounted within said nacelle; said nacelle having a steeply boattailed aft end; an exit device through which gases exhausting from said engine are directed toward said nacelle aft end; said exit device being mounted within said nacelle and forward of said aft end; and a plurality of spaced three-dimensional body means having surfaces certain of which are exteriorly affixed to said nacelle adjacent said boattailed aft end; said body means extending forwardly of said nacelle aft end and rearwardly beyond said aft end and having a substantial circumferential surface area; the portion of surfaces of said body means forward of said nacelle aft end being faired into said nacelle and having a progressively increasing dimension from the forward extremity thereof to a maximum dimension substantially at said nacelle aft end, the portion of each surface of said body means aft of the region of said maximum dimension having a progressively decreasing dimension to a point; said body means extending rearwardly of said nacelle being designed so that all surfaces thereof are exposed to flow thereover permitting simultaneous flow of a radial component of velocity of either external flow of the propulsion engine gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; said body means being hinged adjacent their geometric centers to said nacelle; and actuator means for deflecting said body means into the engine exhaust to provide thrust reversal.

39. In an airplane comprising: a nacelle, a propulsion reaction engine mounted within said nacelle; a plug housed within said nacelle and being spaced from said nacelle; said nacelle having a boattailed aft end; a plurality of body means spaced about and faired into said nacelle on the exterior of the boattailed aft end extending forwardly and rearwardly of the end of the nacelle forming a generally slotted configuration; said body means rearwardly of said nacelle being designed so that all surfaces thereof are exposed to flow thereover permitting simultaneous flow of a radial component of velocity of either external flow on the propulsion engine exhaust gases; said body means forward of the nacelle end effectively increasing the cross sectional area of said nacelle and decreasing its slope angle and rearward of the nacelle aft end preventing an increase in overall base area due to the forward area and also receiving thrust forces from engine exhaust gases whereby pressure drag is reduced and pressure on the nacelle end is increased while maintaining a fixed structural geometry; and means for deflecting said body means into engagement with said plug to provide thrust reversal.

References Cited
UNITED STATES PATENTS

| | | | |
|---|---|---|---|
| 2,846,164 | 8/1958 | Haberkorn | 244—12 |
| 2,931,171 | 4/1960 | Tyler et al. | 239—265.17 |
| 2,940,252 | 6/1960 | Reinhart | 239—265.17 |

EVERETT W. KIRBY, *Primary Examiner.*